July 10, 1962 J. C. MARSH 3,044,052
MEANS FOR INDICATING OR UTILIZING CHANGES
IN TENSION OF WEBS AND THE LIKE
Filed Nov. 23, 1959 2 Sheets-Sheet 1

INVENTOR
John C. Marsh

Scrivener & Parker
ATTORNEYS

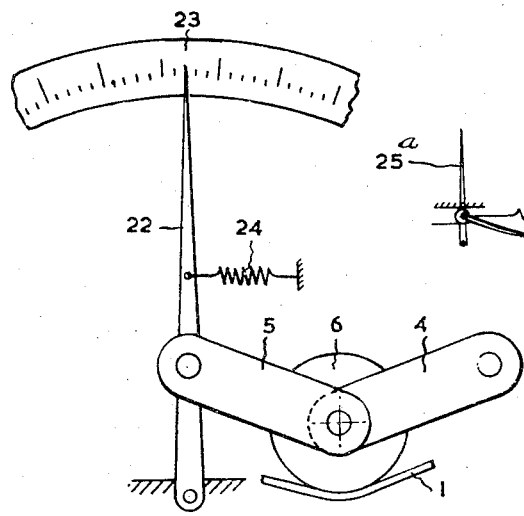
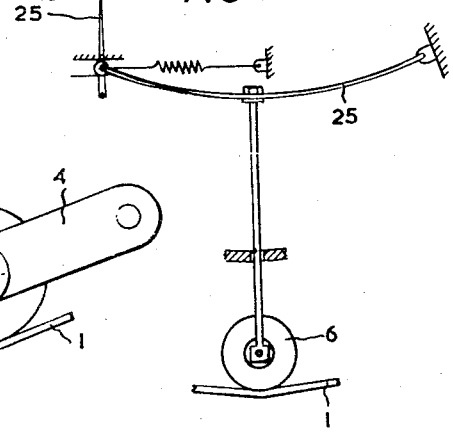
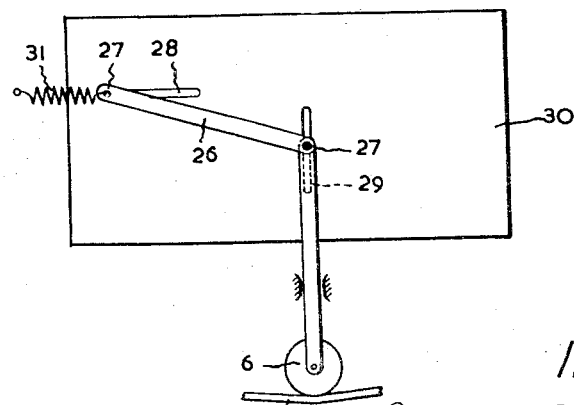

United States Patent Office 3,044,052
Patented July 10, 1962

3,044,052
MEANS FOR INDICATING OR UTILIZING CHANGES IN TENSION OF WEBS AND THE LIKE
John Cleworth Marsh, 16 Pendragon Road, Birmingham, England
Filed Nov. 23, 1959, Ser. No. 854,982
5 Claims. (Cl. 340—259)

This invention is concerned with means for detecting, indicating or utilising changes in the tension in a belt, chain, web, or like flexible member.

In belt power transmission systems it is known to provide a safety device to disconnect the drive when the belt is overloaded, the device being in the form of a jockey pulley carried on a spring-loaded arm and deflecting a part of the tension side of the belt from the substantially straight (neglecting belt weight) path that the belt would otherwise follow. Movement of the arm is used to control means for disconnecting the drive or sounding an alarm when the belt tension exceeds a predetermined amount, or to shift, in the appropriate direction, an infinitely variable gear in the drive. Likewise it is known to measure the value of the belt tension by observing the deflection of a spring-loaded arm mounted in this manner. However, a serious difficulty arises here since, unless the deviation of the belt from the straight path is made very substantial, or the range of movement of arm is restricted to a very small amount, the deflection of the arm per unit change in belt tension varies with the amount of the tension, until at high belt tensions, with the deflection of the belt very small, the change in deflection is very small even for large changes in tension. Consequently any indicating device will have its scale markings very much bunched up towards the upper end of the scale.

This problem has hitherto been found so troublesome that it has been common practice to avoid any form of pointer reading for indicating belt tension and instead to apply a gradually increasing deflecting force to the jockey pulley until a predetermined deflection is obtained and then to read the value of the force required to produce this deflection. However, such a reading is clearly troublesome and time-wasting in comparison to the straightforward reading of a pointer.

The chief aim of the present invention is to provide means for measuring, indicating or acting upon changes in tension in a belt, chain, rope, web of material or the like in which, even though the deflection from the straight path is only small, the deflection is at least reasonably linear over a wide range of tensions. A further aim is to provide equipment of this nature of robust construction and lower cost than existing equipment, avoiding the use of delicate and easily damaged parts.

According to the invention a device for utilising changes in the tension in a belt, chain, rope, web of material or like flexible member (hereinafter called a web) comprises a member engaging the web and deflecting the web from the substantially straight path that it would, in the absence of the member, follow movement of the member being opposed by spring means or equivalent means and being utilised, through the medium of a linkage, to actuate devices to indicate or act on changes in tension, in which the mechanical linkage between the member and the spring or equivalent means has a mechanical advantage varying with position such as to cause the increments of movement of the point of application of the spring or equivalent means for given increments of movement of the member to be reduced as the web approaches the straight path, in a manner so that the movement of the point of application of the spring or equivalent means varies at least approximately linearly with changes in belt tension.

The invention is particularly applicable to devices for disconnecting belt power transmissions when, through overloading, there is a risk of breakage, or it could be used to give an alarm signal, or to alter the ratio of a variable-speed drive in the power transmission to reduce the load on the belt. It may also be applied to conveyor belts, to chain drives, ropes, webs of textile material undergoing processes, webs of paper such as newsprint, and even to single threads in sewing machines, and it is not essential that the web should be in motion. In all cases the invention may be used to give a continuous pointer reading of the tension and/or to cause action to be taken when the tension exceeds a predetermined amount, and this predetermined amount is made adjustable over a wide range.

In a preferred arrangement the member engaging the web is a roller or pulley (or it may be a sprocket in the case of a chain), and the linkage having the variable mechanical advantage is a toggle linkage, with the roller acting on the centre pivot of the toggle linkage and the one end pivot being fixed whilst the other is constrained to move in a direction at right angles to the direction of movement of the centre pivot and acts, directly or indirectly, on the spring means. The roller could be mounted directly on the centre pivot of the toggle linkage or it could be connected to it through further links in tension or compression.

Instead of a toggle linkage, a bowed leaf spring could be used, one end being fixed and the other movable in a direction parallel to the line joining its two ends, whilst the roller acts on the centre of the bowed portion. Yet again, one could constrain the roller to move in a direction perpendicular to the run of the web, by mounting it on a pivot pin which can slide in a pair of slots in a pair of spaced plates, and this pin is connected through an inclined link or links to a further pin constrained to slide in a pair of slots extending at right angles to the first-mentioned pair.

It will be understood that instead of the spring means mentioned above, a weight or other equivalent means could be used to oppose the belt tension and in the specification description where we use the term "spring" it is to be understood that other means such as a weight may be used and the weight could be in the form of a pendulum.

An example of an embodiment of the invention and of some possible modifications thereof will now be described by way of example with reference to the accompanying drawings, in which:

FIGURE 2 shows diagrammatically how the invention may be applied to a device for indicating belt tension; and FIGURES 3 and 4 show diagrammatically alternative forms of linkage.

Figure 1:
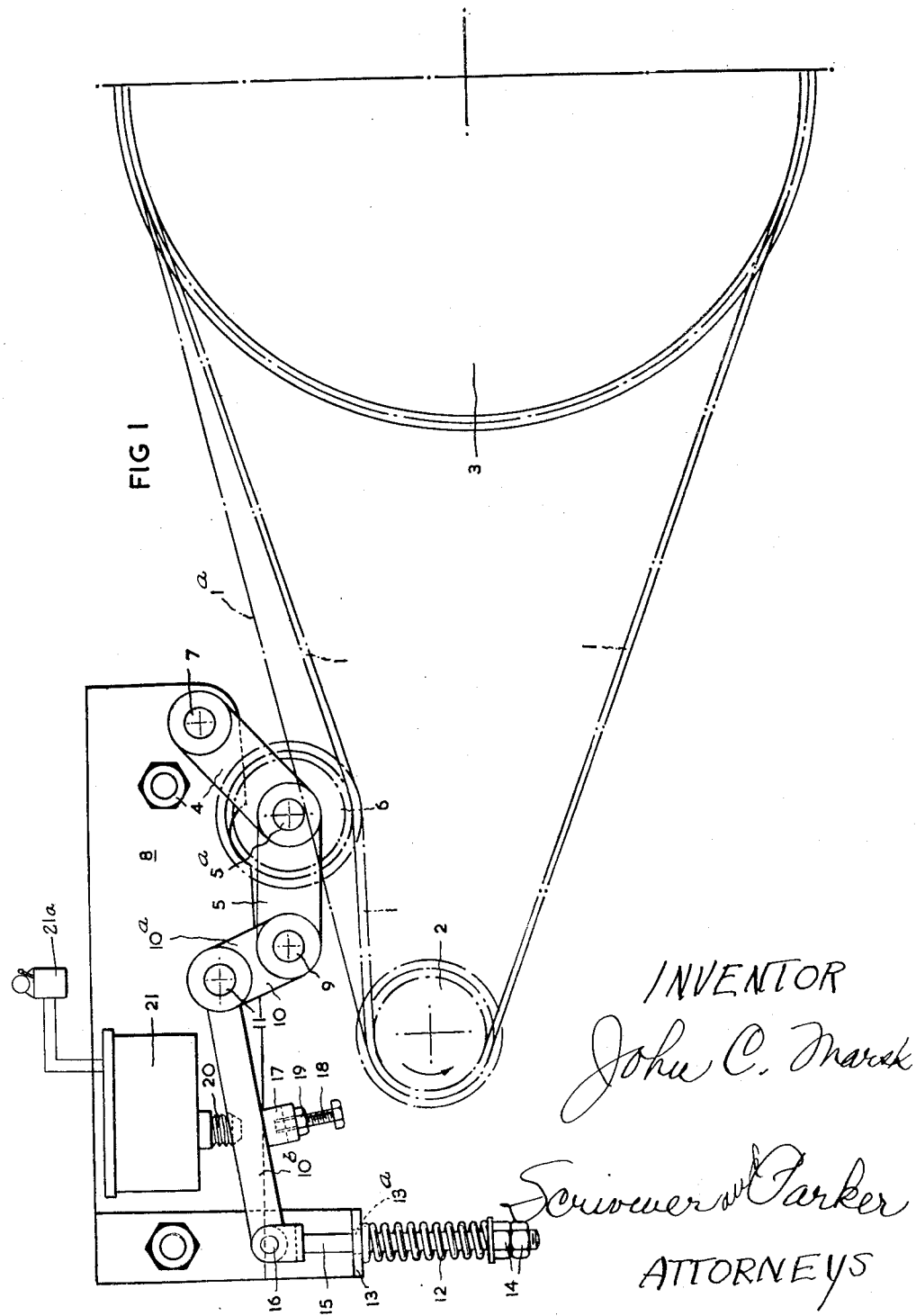
FIGURE 1 is an elevation of a power transmission belt to which is applied a device in accordance with the invention for disconnecting the drive when the tension in the belt exceeds a predetermined amount, the value of this amount being adjustable.

Referring first to FIGURE 1, a belt 1 transmits power from a pulley 2 and pulley 3, and the tension side of the belt would normally be straight, apart from a negligible sag caused by its own weight. To detect changes in tension I provide a toggle linkage formed by pairs of links 4 and 5, carrying at their common pivot 5a a jockey pulley 6 which engages the face of the belt and deflects it from the straight path 1a. The other end of link 4 is pivoted to a fixed pivot 7 carried between a pair of spaced parallel mounting plates of which one is visible at 8, the other having been removed to reveal the internal construction of the device. The other end of the other link 5 is pivoted at 9 to the short arm 10a of an unequal-arm bell-crank lever 10 pivoted to the plates 8 at 11. The long arm 10b of the lever 10 is acted on by a helical coil compression spring 12, the spring engaging at one end a fixed abutment 13 and at its other end a pair of locknuts 14 carried on a threaded rod 15 which passes through an aperture 13a in the abutment 13 and is pivoted to the end of the long arm at 16.

An intermediate point in the long arm carries a bracket 17 into which is screwed an adjustable stop 18, which can be locked in its adjusted position by a nut 19. On angular movement of the bell-crank lever 10 the stop 18 engages the plunger 20 of an electric microswitch 21, which is used to disconnect the drive, as will be described. Alternatively the micro-switch 21 may sound an alarm indicated schematically at 21a.

It will be appreciated that, as the load transmitted by the belt increases, the belt tension increases accordingly, and this causes the tension side of the belt to become more nearly straight, moving the pulley 6 and its associated linkage against the action of the spring 12. In known safety devices of this general kind, the jockey pulley would simply be mounted on a spring-loaded arm and, at high tensions, and consequently small deflections, the mechanical movement is very small for a given change in tension, as compared with the movement for a given change in tension at lower tensions. This is a consequence of the fact that it requires only a very small force to produce a small deflection of a nearly straight belt, and the force required to produce a given change in deflection rises as the deflection from the straight increases.

In the arrangement according to the invention this difficulty is overcome by the provision of the toggle linkage 5 and 6, which has a mechanical advantage that varies with deflection in a manner such as substantially to compensate for the variable factor mentioned in the preceding paragraph. The result is that angular movement of the lever 10 is at least approximately proportional to the tension in the belt over the range of movement of the device. It will be clear that some latitude is available in the design, in particular in the angularity of the links 5 and 6, but the essential point is that they should not quite reach a "dead-centre" position, even with the belt virtually straight. In the example shown it is arranged that the deflection of the belt from the straight path when the belt is at rest is about three times its deflection at its maximum permissible tension. By virtue of the fact that the movement of the lever for a given change in deflection is smaller when the toggle linkage is more nearly straight than when its links are at a greater inclination to one another, the movement of the lever is approximately proportional to belt tension over this three-to-one range.

In the example shown in FIGURE 1 the device is used simply as an "on-off" device, disconnecting the drive when the belt tension exceeds a predetermined value, and this value is adjustable by appropriate adjustment of the nuts 14 and of the stop 18. By extension of the long arm lever 10 the device of FIGURE 1 could be used instead to adjust a variable speed mechanism in the drive to reduce the belt load or keep it substantially constant. A further possibility would be for the arm to actuate a rheostat in the circuit of a direct current motor which may be supplied through a rectifier. If necessary amplification either electric, electronic or mechanical could be used where the driving motor or motors are large, so as to avoid putting an undue load on the arm.

FIGURE 2 shows diagrammatically how the device may be used to provide a scale reading of the belt tension. The end of the link 5 is pivoted to an arm 22 forming a pointer moving over a scale 23, and the force opposing the belt tension is applied by a tension spring 24.

FIGURE 3 shows how the toggle linkage 5 and 6 may be replaced by its mechanical equivalent in the form of a bowed spring 25, one end of which is fixed and the other moves against spring pressure to actuate a pointer 25a or an overload warning device or switch. This figure also shows how there is no need for the member that engages the belt to be connected directly to the toggle linkage or its equivalent. In fact the only essential thing is that, somewhere in the mechanical linkage between the member engaging the belt or web and the opposing spring device having a mechanical advantage that varies with movement in such a direction as to compensate approximately for the non-linear variation of belt deflection with load.

A further form of linkage with variable mechanical advantage is shown in FIGURE 4. Here a link 26 extends between pins 27 which slide in respective slots 28 and 29 in a pair of supporting plates 30. The slots 28 and 29 extend in directions at right angles to one another, and, over the normal range of movement, the link 26 is at small acute angle (comparable with the angle of deflection of the belt from its straight path) to the slot 28, and a spring 31 that opposes the belt tension acts on the pin in that slot, whilst the jockey pulley 6 engaging the belt or web is connected to the pin 27 sliding in the other slot 29.

Whilst the invention has been described with reference to a belt drive, it will be understood that it may be applied to a wide variety of equipment involving flexible webs in which the tension is liable to vary, and the web may or may not be in motion. One particular application of the invention is ensuring even tension in very long conveyor belts and overhead or floor level chain conveyors that are driven at a number of points. Devices in accordance with the invention are placed at suitable intervals along the belt or chain to detect any unequal tension distribution and initiate the necessary corrective action. The devices have the advantage that they deflect the belt from its normal path to only a negligible extent.

What I claim is:

1. A device for indicating changes in the tensions in a flexible web of material under tension as herein defined comprising a member engaging and deflecting said web from the substantially straight path that said web would, in the absence of said member, follow, toggle means comprising first and second toggle links, a fixed pivot locating one end of said first toggle link, a pivotal connection between the other end of said first toggle link and one end of said second toggle, said toggle links making an obtuse angle with one another, a connection between said web-engaging member and said pivotal connection such that movement of said web-engaging member in a direction such as to allow a reduction in the deflection of said web causes said obtuse angle to increase, guide means for the other end of said second toggle link, said guide means allowing said other end to move along a line in the general direction of said fixed pivot, resilient force-applying means acting on said other end of said second toggle link in a direction towards said fixed pivot such as to cause a tendency to reduction of said obtuse angle and thereby to an increase in the deflection of said web, and indicating means responsive to the position of said other end of said second toggle link to indicate the tension in said web.

2. A device for signalling changes in the tension in a flexible web of material under tension as herein defined comprising a member engaging and deflecting said web from the substantially straight path that said web would, in the absence of said member, follow, toggle means comprising first and second toggle links, a fixed pivot locating one end of said first toggle link, a pivotal connection between the other end of said first toggle link and one end of said second toggle, said toggle links making an obtuse angle with one another, a connection between said web-engaging member and said pivotal connection such that movement of said web-engaging member in a direction such as to allow a reduction in the deflection of said web causes said obtuse angle to increase, guide means for the other end of said second toggle link, said guide means allowing said other end to move along a line in the general direction of said fixed pivot, resilient force-applying means acting on said other end of said second toggle link in a direction towards said fixed pivot such as to cause a tendency to reduction of said obtuse angle and thereby to an increase in the deflection of said web and alarm means responsive to the position of said other end of said second toggle link to actuate an alarm when the tension in said web exceeds a predetermined value.

3. A device for limiting the tension in a flexible web of material under tension as herein defined comprising a member engaging and deflecting said web from the substantially straight path that said web would, in the absence of said member, follow, a first pivot, a rigid connection between said web-engaging member and said first pivot, first pivot guide means, said first pivot guide means constraining movement of said first pivot to a direction substantially perpendicular to said web, a second pivot, a second pivot guide means, said second pivot guide means constraining movement of said second pivot to a direction parallel to said web, an inextensible link joining said first and second pivots, resilient force-applying means, said force-applying means acting on said second pivot in a direction parallel to the general direction of said web and said link extending in a direction which makes an acute angle with the general direction of said web, together with means responsive to the position of said second pivot to relieve the tension in said web when the tension exceeds a predetermined value.

4. A device as claimed in claim 3, wherein said first pivot guide means comprise a further link, said further link extending in a direction making an acute angle with the direction of said web, and said further link having its one end connected to said first pivot and its other end pivoted to a fixed point.

5. A device as claimed in claim 3, wherein said second pivot guide means comprise a bell-crank lever having a short arm and long arm and pivoted to a fixed point, said short arm being connected to said second pivot and extending substantially perpendicular to the general direction of said web, and said long arm being acted on by said resilient force-applying means.

References Cited in the file of this patent
UNITED STATES PATENTS

| | | |
|---|---|---|
| 2,066,721 | Eaton | Jan. 5, 1937 |
| 2,104,952 | Saelens et al. | Jan. 11, 1938 |
| 2,222,666 | Jacobson et al. | Nov. 26, 1940 |
| 2,343,084 | Rich | Feb. 29, 1944 |
| 2,499,287 | Wilson | Feb. 28, 1950 |
| 2,663,195 | Horan | Dec. 22, 1953 |